(12) United States Patent
Mouli (10) Patent No.: US 7,733,392 B2
(45) Date of Patent: Jun. 8, 2010

(54) METHOD AND APPARATUS FOR REDUCING EFFECTS OF DARK CURRENT AND DEFECTIVE PIXELS IN AN IMAGING DEVICE

(75) Inventor: Chandra Mouli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 238 days.

(21) Appl. No.: 12/078,722

(22) Filed: Apr. 3, 2008

(65) Prior Publication Data

US 2008/0259185 A1 Oct. 23, 2008

Related U.S. Application Data

(63) Continuation of application No. 10/603,796, filed on Jun. 26, 2003, now Pat. No. 7,372,484.

(51) Int. Cl.
*H04N 9/64* (2006.01)
(52) U.S. Cl. .................................................... 348/246
(58) Field of Classification Search ................ 348/188, 348/229.1, 246, 243, 247, 251
See application file for complete search history.

(56) References Cited

U.S. PATENT DOCUMENTS

| 5,047,861 A | 9/1991 | Houchin et al. |
| 6,061,092 A | 5/2000 | Bakhle et al. |
| 6,101,287 A | 8/2000 | Corum et al. |
| 6,144,408 A | 11/2000 | MacLean |
| 6,683,643 B1 | 1/2004 | Takayama et al. |
| 6,737,625 B2 | 5/2004 | Baharav et al. |
| 6,747,696 B1 | 6/2004 | Nakata et al. |
| 6,992,712 B2 | 1/2006 | Yoshida |
| 7,102,673 B2 | 9/2006 | Kimura |
| 7,113,210 B2 | 9/2006 | Bloom |
| 7,133,072 B2 | 11/2006 | Harada |
| 2002/0015111 A1 | 2/2002 | Harada |

FOREIGN PATENT DOCUMENTS

| CA | 2324242 | 9/1991 |
| EP | 1 083 740 A2 | 3/2001 |
| EP | 1 271 933 A2 | 1/2003 |

OTHER PUBLICATIONS

International Search Report dated Nov. 25, 2004.

*Primary Examiner*—James M Hannett
(74) *Attorney, Agent, or Firm*—Dickstein Shapiro LLP (57) ABSTRACT

A method and apparatus for identifying and compensating for the effects of defective pixels in high resolution digital cameras having image processing apparatus. The apparatus includes a storage system for storing data corresponding to either a dark current reference image and a white reference image and at least one actual image captured by a pixel array, and at least one processor coupled to the storage system for compensating the data corresponding to the actual image based upon the stored data. The method includes capturing and storing both dark and white reference images as well as capturing and storing actual images, identifying pixels that are affected by dark current or are defective pixels, reading data corresponding to pixels of an actual image affected by dark current or that are defective from the storage system and compensating the affected pixels.

20 Claims, 9 Drawing Sheets

METHOD AND APPARATUS FOR REDUCING EFFECTS OF DARK CURRENT AND DEFECTIVE PIXELS IN AN IMAGING DEVICE

CROSS REFERENCE TO RELATED APPLICATIONS

The present application is a continuation of U.S. application Ser. No. 10/603,796, filed on Jun. 26, 2003 now U.S. Pat. No. 7,372,484, the disclosure of which is herewith incorporated by reference in its entirety.

FIELD OF THE INVENTION

The present invention relates to the identification and compensation of the effects of dark current and defective pixels in an imaging device.

BACKGROUND OF THE INVENTION

Dark current refers to an undesired signal generated by a pixel of an imaging device even in the absence of a light signal. One source of dark current is thermally-generated electrons and holes. Thermally generated dark current in a CMOS active pixel imaging device presents problems in many imaging applications. As temperature increases, dark current likewise increases. Thermal energy generates unwanted free electrons in pixels. These unwanted free electrons alter the desired signal produced by electrons generated by incident photons. Additionally, some digital still cameras require long integration (exposure) times, which allows for higher image sensitivity. However, the longer the integration time the higher the sensitivity to thermally generated dark current.

The largest portion of unwanted free electrons in a pixel array occurs at the interface between a silicon dioxide layer overlying a substrate and an epitaxial or other silicon substrate layer of a chip on which pixel devices are formed. Even in an ideal defect-free process, dark currents also exist due to generation/recombination centers in the depletion region of a photodiode employed as the light sensitive element of a pixel. There are thermodynamic lower limits for dark currents, which place limitations on light sensitivity. As pixel technology is scaled down for high-density mega-pixel arrays for single chip digital cameras, sub-micron CMOS technology process-induced defects increase dramatically. Stress, extended defects and metallic impurities among other factors all contribute to undesirable dark current.

For example, the transfer, reset, source follower transistors typically employed in a four transistor (4T) pixel must be scaled down to achieve higher pixel density. Such scaling is not possible without a corresponding increase in dopant levels (e.g., p-well, $V_t$-adjustment and halo implant) and a reduction in gate oxide thickness for the transistors. This leads to higher levels of junction leakage, gate induced drain leakage (GIDL), drain-induced barrier lowering (DIBL) among others. All of the above contribute to undesired dark current levels. Additionally, field isolation region pitch must also be scaled down leading to increased stress levels and electron leakage near the field-edge of the photodiode.

Dark current for a given pixel actually has two components, a static portion and a variable portion. The variable portion is due to shot noise and follows Poisson statistics, with the root mean square (rms) dark current noise being equal to the square root of the dark current.

One method of compensating for dark current has been to identify an average pixel dark current and subtract that average value from each pixel signal. This method, however, fails to provide accurate and realistic images and ignores dark current noise, which is generated from outside of the image area. This technique is not repeatable and does not work well for most CMOS image sensors.

Defective pixels are another problem with imagers. Defective pixels include hot pixels, bad pixels and dead pixels. Hot pixels have a higher than average dark current, which arises from the manufacturing process so the dark current caused by each hot pixel remains fixed and can be corrected. Hot pixel information is recorded with dark current information and dark current compensation will also compensate for hot pixels. Bad pixels are pixels that are bad when manufactured or have an indication that they may go bad during their life. Detection of bad pixels is accomplished by capturing images of a uniformly lit background with different integration times. In particular, as the integration time is increased, a well-behaved (i.e., good) pixel is expected to produce a signal which increases linearly as a function of the increasing integration time. Pixels that behave in a non-linear fashion (for example, respond to linearly increasing integration times with spurious values) are identified as bad pixels. Dead pixels are pixels that do not respond correctly to light input. These pixels may appear as a colored bright dot or a dark dot on an image depending on the failed mechanism. There are three forms of dead pixels; dark dead pixels, white dead pixels and saturation dead pixels. Dead pixels can be detected either by hardware or by software after a pixel array is fabricated. A dark dead pixel is detected when the dark threshold value is above an average value of normal pixels under no light condition. A white dead pixel is detected when the white threshold value is above or below an average value for normal pixels under, for example, approximately a 28 Lux light condition. A saturation dead pixel is detected when the saturation threshold is below an average value of normal pixels under, for example, approximately a 100 Lux light condition.

Defective pixels, such as hot pixels, dead pixels and bad pixels are created during the manufacturing process may occur during the life of an imaging device containing a pixel array. Yield considerations and replacement costs for pixel arrays dictate that an alternative to discarding pixel arrays or replacing cameras or pixels arrays of imaging devices be provided.

SUMMARY OF THE INVENTION

The present invention provides a method and apparatus for reducing the effects of dark current and defective pixels in imaging devices. The present invention uses the on-board available memory associated with the pixel sensor array to reduce the effects of dark current and defective pixels by capturing and storing dark reference images and white reference images under different gain conditions and with different exposure times (integration times), before an imaging device is released from the factory for shipment. A user may also capture additional dark current reference images and white reference images under different gain conditions and exposure times in addition to, or in lieu of, the reference images captured at the time of manufacture. The captured dark current and white reference images are used to produce corrections for dark current and defective pixels when an actual image is acquired by a pixel array.

These and other features of the invention will be more clearly understood from the following detailed description of the preferred embodiments of the invention, which is provided in connection with the accompanying drawings.

BRIEF DESCRIPTION OF THE DRAWINGS

FIG. 3-a is a flowchart of an exemplary method for dark current and defective pixel compensation of the present invention prior to digital camera during operation by a user.

FIG. 3-b is a continuation of FIG. 3-a.

FIG. 3-c is a flowchart of an expanded view of step 380 of FIG. 3-b.

FIG. 3-d is a flowchart of an expanded view of step 375 of FIG. 3-b.

FIG. 3-e is an example of a signal for a characteristic in a reference image.

FIG. 3-f is an example of the signal for the characteristic of FIG. 3-e in an actual image.

DETAILED DESCRIPTION OF THE PREFERRED EMBODIMENTS

White and dark current reference images are captured under most, if not all, possible combinations of gain and exposure, which may be encountered during use of the digital camera. The white and dark reference images are then used to produce data, stored in data structures (such as tables, lists, arrays, matrices, etc.) identifying pixels, which need correction and the kind of correction that is needed for every gain and exposure combination, which might be employed during use of the digital camera. The data structures are stored in non-volatile memory. During use of the digital camera for the actual captured image, the associated gain and exposure combination is used to access and retrieve the identification/location data that most closely match the gain and exposure combination of the actual captured image. The pixels needing correction and the type of correction needed are identified and used to correct the pixels of the actual image. The kind or type of correction that is needed includes information such as whether a defective pixel, for example, is a dark dead pixel, a white dead pixel, a saturation dead pixel or a bad pixel.

Under different gain conditions and exposure times, dark current and white reference images are captured. High dark current under low gain conditions signifies a white point defect. Dark current under high gain conditions gives a relative magnitude of leakage in pixels. This information is used to create a coordinate list of poor quality pixels. Specifically, the former (high dark current under low gain conditions) is the result of a process defect that cannot be easily corrected. The latter (leakage) is a process variation issue. The latter is a more significant problem in small size pixels due to process variations, such as mask mis-alignments, microlens mis-alignments etc., and is a growing concern. The present invention provides an ability to make corrections to compensate for process variations and create more uniform quality pixels in an array for high density, small size pixel designs.

Each type of correction has its own set of data. That is, there are respective pixel location data for pixels affected by dark current (including hot pixels) and defective pixels. This data respectively identifies and locates pixels that have been affected by dark current or are hot pixels and defective pixels, including dark dead pixels, white dead pixels, saturation dead pixels and bad pixels. At some point, a user captures actual images. Whereupon, using the location of the pixels needing correction and data on the type of correction needed, the signal values of the pixels of the actual images can be corrected. For example, using the dark current pixel location data (for a given gain and exposure combination) an average signal value is calculated for the dark current pixels identified in the dark current pixel location data. This value is stored in memory. Using the dark dead pixel location data, a set of pixels is identified that has a dark threshold value above the average value of normal pixels under a no light condition. The pixels thus identified are corrected using smoothing or scaling as described below. It should be noted that a single integrated pixel location data structure could be created and used. However, pixels may be affected by more that one type of defect and may therefore, require multiple corrections so a single integrated pixel location data structure may need to be multi-dimensional or contain an indication of the type of defect or in the alternative the type of correction required. Multiple pixel location data structures are used in the description which follows, but a single pixel location data structure could also be employed. The single pixel location data structure would either have to be multi-dimensional or contain and indication of the type of defect or type of correction required.

There are several ways to a create pixel location data structure or data structures. In one exemplary embodiment, the dark current and white reference images would be overlayed one on top of the other and logical operations such as AND and/or EXCLUSIVE-OR performed to gate the location of the pixels into a pixel location data structure. The logical operations will provide a set of pixels that have high leakage. The exact row and column locations for these pixels can be found using existing row and column decoders. In an alternative exemplary embodiment, the dark current and white reference images can be used separately. Images captured under low gain conditions are passed through a filter that is tuned to a certain leakage level. The tuning parameter is a variable that is passed to the filter, which can be implemented in hardware of software. Using different leakage levels as criteria, bins of (histogram) pixels can be created that represent pixels that have leakage levels in the range of a particular bin. This information is stored in available buffers and provides a quick reference to the relative magnitude of leakage in different pixels and can be used further in processing images taken under different gain conditions, exposure times and light conditions.

Figure 1A:
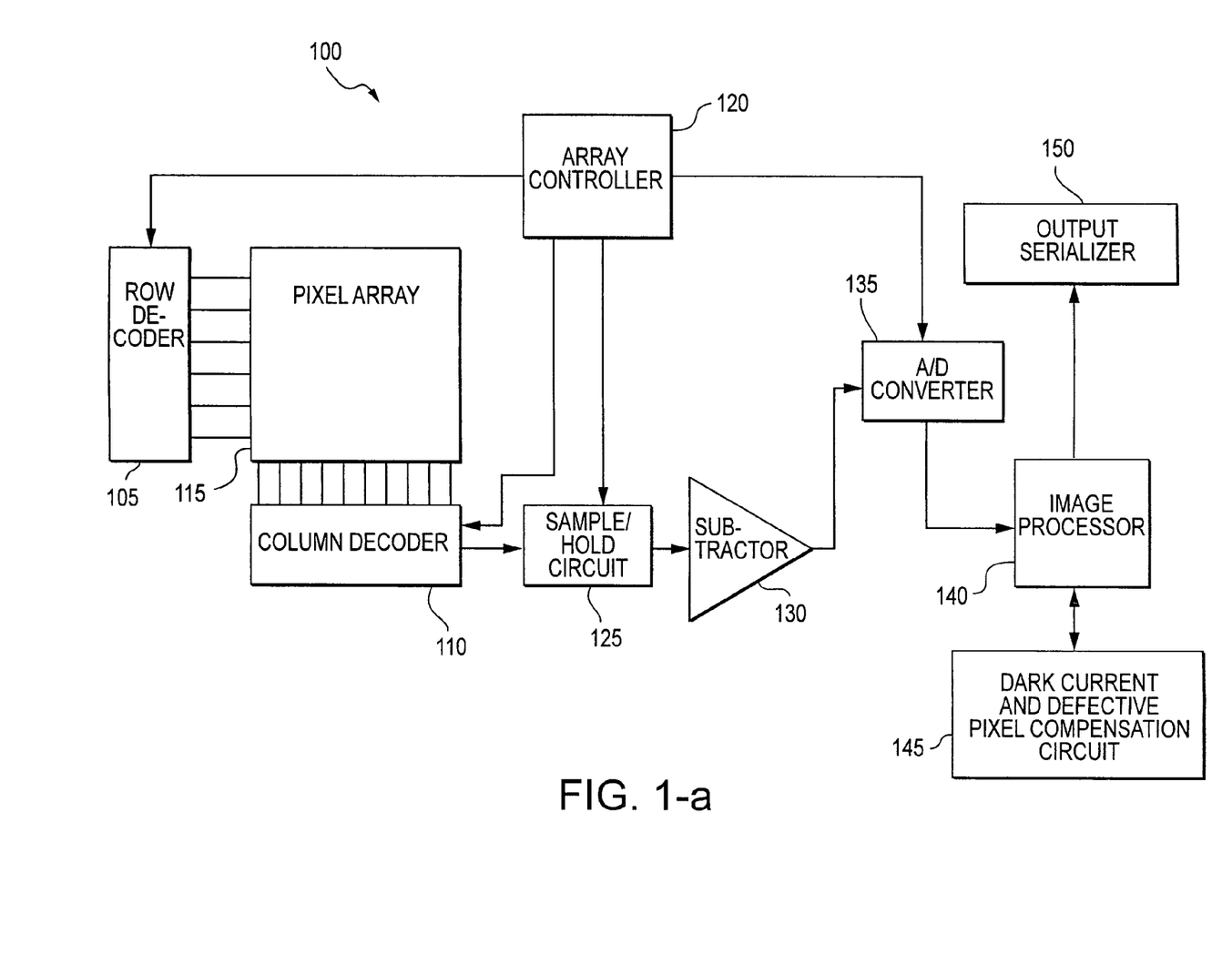
FIG. 1a is a block diagram of an exemplary digital camera system having a dark current and defective pixel compensation circuit of the present invention.

FIG. 1a is an exemplary embodiment of a portion of a digital camera system 100, which employs an image processor 140 and has a dark current and defective pixel compensation circuit 145 in accordance with the present invention. FIG. 1a could be integrated together in one integrated circuit or could be implemented with discrete components. Row decoder 105 and column decoder 110 are coupled to pixel array 115 are used to select a pixel in the pixel array 115. Each pixel outputs a pixel reset signal $V_{rst}$ and a pixel image signal $V_{sig}$. Array controller 120 is coupled to the row decoder 105 and column decoder 110 and determines which row and column are activated to produce the $V_{rst}$ and $V_{sig}$ signals of the selected row and column lines of pixel array 115. The sample/hold circuit 125 sequentially receives the pixel signal from the column lines through the column decoder 110 selection circuit. The sample/hold circuit 125 provides the $V_{rst}$ and $V_{sig}$ pixel signals to subtractor 130, which subtracts them. Analog-to-digital (A/D) converter 135 accepts the signal from subtractor 130 and outputs digital signals representing the subtracted $V_{rst}$ and $V_{sig}$ pixel signals to image processor 140. Image processor 140 is also coupled to dark current and defective pixel compensation circuit 145 and also to output serializer 150.

Figure 1B:
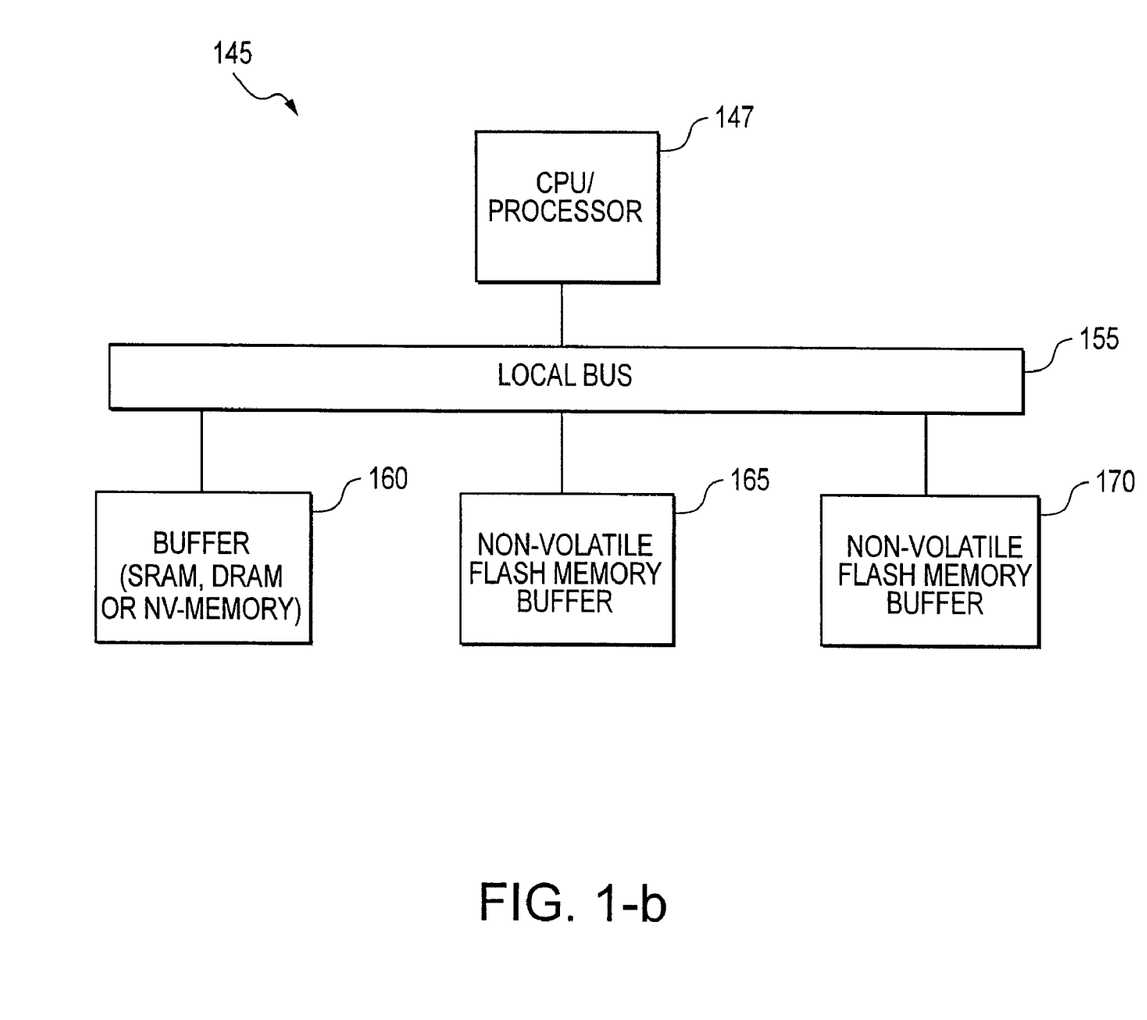
FIG. 1b is a block diagram of an exemplary embodiment of a dark current and defective pixel compensation circuit of the present invention in a digital camera.

FIG. 1b is a block diagram of an exemplary implementation of dark current and defective pixel compensation circuit 145. A CPU 147 or other type of processor performs image compensation. CPU 147 is coupled to a local bus 155 to control communications between CPU 147 and other memory components. Non-volatile flash memory buffer 165 stores a plurality of dark current and white reference pixel array images taken at a variety of gain conditions and with a variety of exposure times. These images are acquired at the time of manufacture and/or later by a user input and are received by CPU 147 from image processor 140. Non-volatile flash memory buffer 170 may be used to store a plurality of actual images. Buffer 160 may be used to store any other required data. Although dark current and defective pixel compensation circuit 145 is shown as a separate component in FIG. 1a, it could be implemented with CPU 147 being the image processor 140.

Dark current and defective pixel compensation circuit 145 may be embedded in a digital solid state camera (DSC), which may be an input to a computer system. Alternatively, the dark current and defective pixel compensation circuit 145 may be provided outboard of the DSC as part of a separate computer system. As noted, dark current and defective pixel compensation could also be implemented in software stored and running in image processor 140.

White and dark current reference images at different exposure and gain conditions may be acquired pre-shipment and/or may be user acquired.

Figure 2:
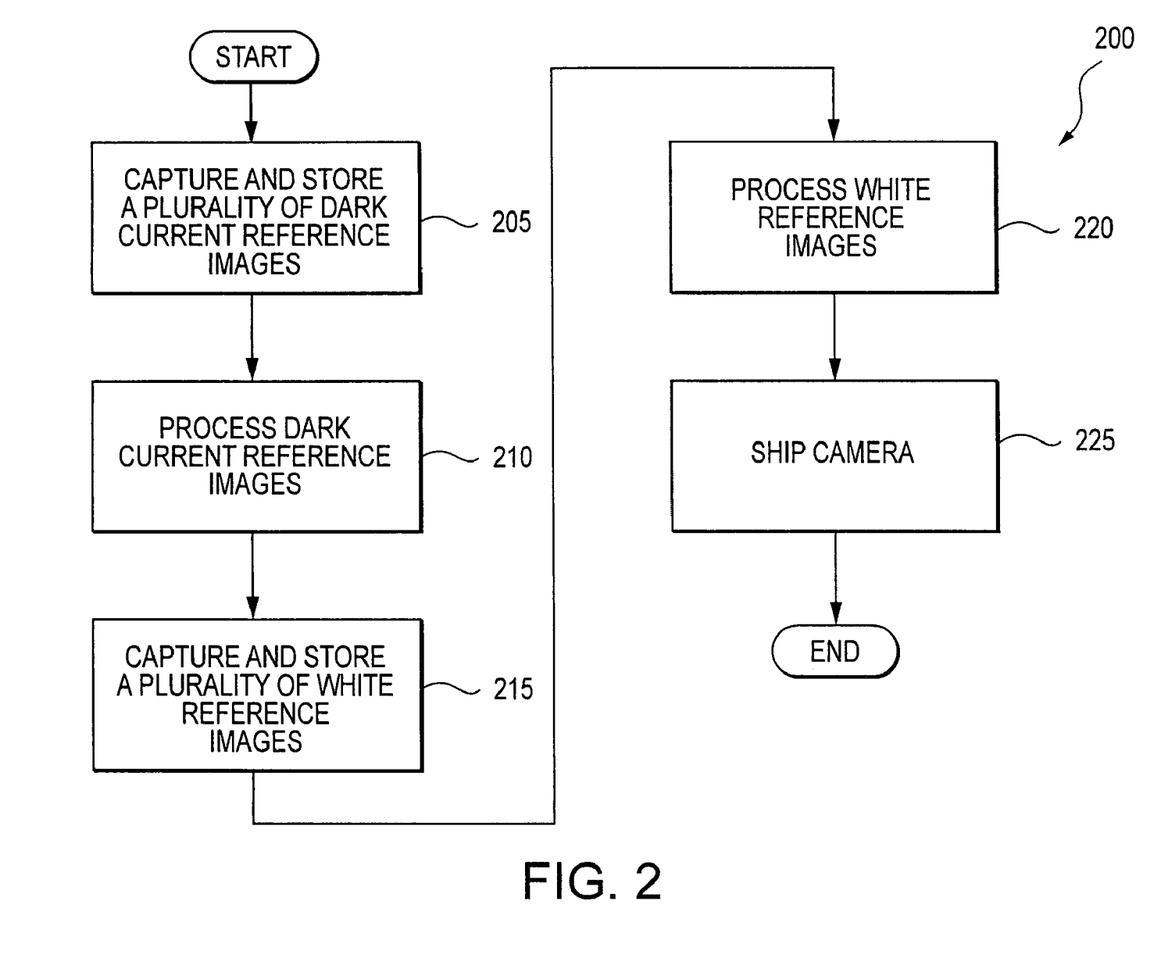
FIG. 2 is a flowchart of an exemplary method for dark current and white reference image capture of the present invention at the time of manufacture and testing.

FIG. 2 is a flowchart of an exemplary method 200 for dark current and white reference image capture at the time of manufacture and testing. At step 205, dark current reference images are acquired under a variety of gain and exposure conditions/combinations. These images are stored in non-volatile flash memory, e.g., memory 165 along with the gain and exposure information for each image.

At step 210, the dark current reference images are processed. This entails generating pixel identification/location data. Data generated from the dark current reference images is used to identify and locate pixels affected by dark current and hot pixels. All data (e.g., stored in data structures such as tables, for example) is stored in memory, e.g., memory buffer 160. Location data are mappings of the pixels of the image sensor. Specifically, a dark current pixel location data structure (for a particular gain and exposure combination) of pixels has bits having a "0" or a "1" indicating that the pixel is, or is not, affected by dark current or is a hot pixel. A dark current and hot pixel location data structure is provided for each dark current reference image for each gain and exposure combination.

Similarly, white reference images under a variety of gain conditions and exposure times are captured and stored at step 215. All data (e.g., stored in data structures such as tables) is stored in memory, e.g., memory buffer 160. The white reference images are captured under a variety of light conditions including no light, light at, for example, a first light level, e.g. at 28 Lux and for example, a second light level, e.g. at 100 Lux. Data generated from the white reference images are used to identify and locate defective pixels. Defective pixels include dark dead pixels, white dead pixels, saturation dead pixels and bad pixels.

At step 220, the white reference images are processed. This entails generating various data structures for the defective pixels as follows. Dark dead pixel location data structures are generated for a variety of gain conditions and exposure times by mapping the location of pixels that have a dark threshold value above an average value of normal pixels under the no light condition. White dead pixel location data structures are generated for a variety of gain conditions and exposure times by mapping the location of pixels that have a white threshold value above or below an average value of normal pixels under, for example, the first light level, e.g. 28 Lux, light condition. Saturation dead pixel location data structures are generated for a variety of gain conditions and exposure times mapping the location of pixels that have a saturation threshold value below an average value of normal pixels under, for example, the second light level, e.g. 100 Lux, light condition. White reference images of bad pixels are captured under a uniformly lit background with different integration times. Bad pixel location tables are generated mapping the location of pixels that do not respond linearly as the integration times are increased.

Mapping may be accomplished in a number of ways. One exemplary mapping scheme may be an array or matrix having an entry corresponding to each pixel, where each entry has an indication whether the pixel corresponding to that pixel is, for example, a dark dead pixel. An array or matrix can be provided for each type of defective pixel or a single matrix of at least three dimensions where the third dimension corresponds to the type of defective pixel. A plurality of arrays or matrices for each type of defective pixel for each gain condition can be provided, with an indication whether the pixel was defective and the gain condition and exposure time combination(s) and light condition(s) under which the pixel was defective. In the alternative, and to save storage especially if only a few pixels are defective, a list-type data structure could be used, where each entry is a record indicating the location of a defective pixel and the nature of the defect.

FIG. 3-a is a flowchart of an exemplary method 300 for dark current and defective pixel compensation. FIG. 3-b is a continuation of FIG. 3-a. Referring first to FIG. 3-a, at step 305 the user is queried to determine if he/she desires to produce data for dark current and defective pixel compensation during operation of the camera; i.e., the user had the option to take additional dark current and white reference images under the current ambient conditions for dark current and defective pixel compensation. These additional dark current and white reference images are more accurate, and include more current ambient conditions than those dark current and white reference images taken at the factory at the time of manufacture and testing of a camera imager, and are also stored in non-volatile flash memory. Based on the response to this query, a flag is set (step 310) or cleared (step 325). If the flag has been set, then dark current and white reference images in addition to those already taken pre-shipment at the factory are taken and stored at step 315 and processed at step 320. The image counter is initialized at step 330. The image counter is used to determine the number of actual images that are captured and compensated using the stored data structures generated at the factory or the stored data structures generated under current ambient conditions. At step 335, the user operates the camera to capture and store the actual images/signals desired and the image counter is incremented at step 340. Along with the actual images that are captured and stored, additional information such as gain and exposure/integration time is captured and stored.

Figure 3A:
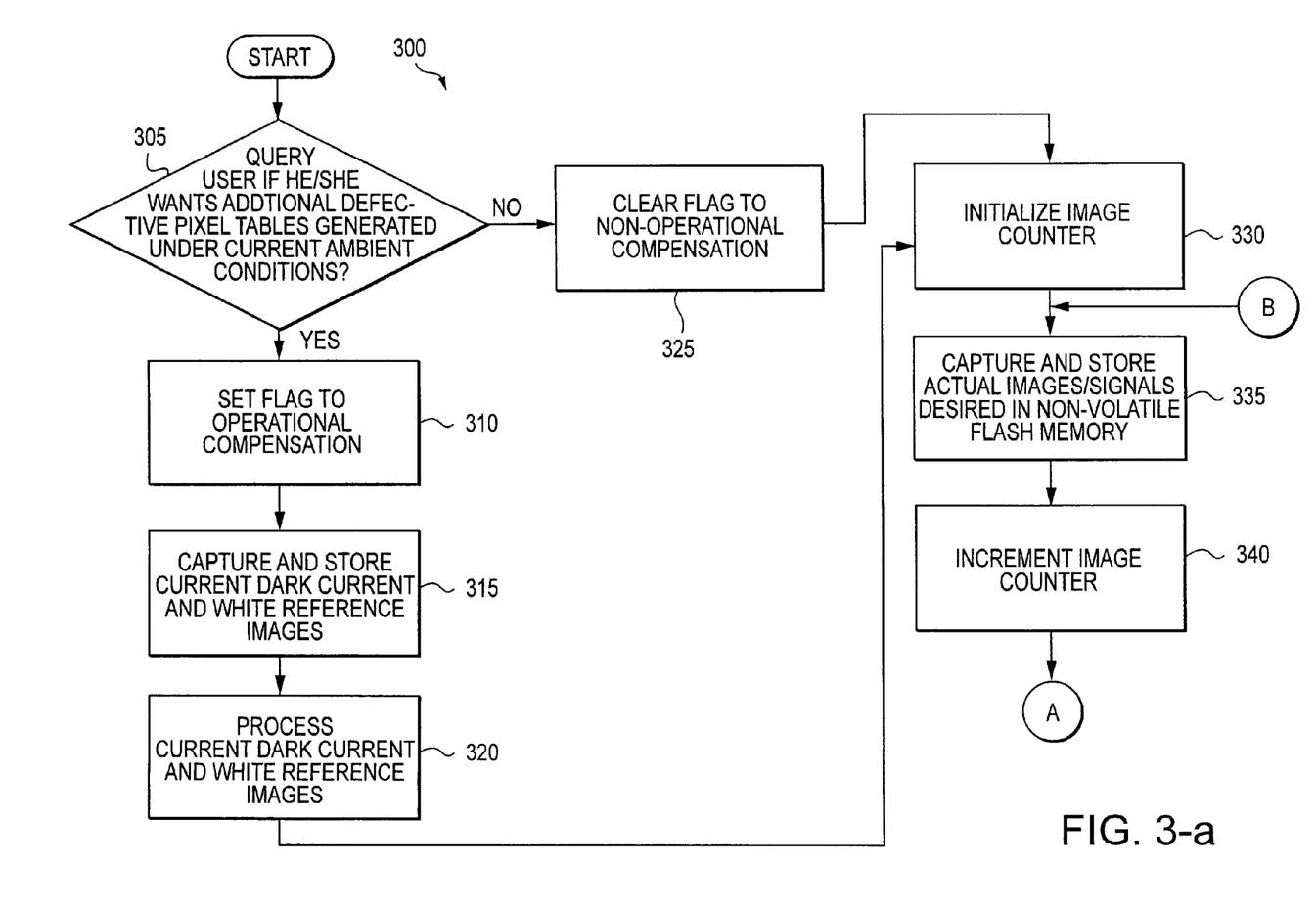

Pixels affected by dark current, including hot pixels, and defective pixels are identified and located based on the data stored in data structures pre-set during the manufacturing process or based on the newly produced data stored in data structures generated at step 320.

FIG. 3-*b* is a continuation of FIG. 3-*a*. An inquiry internal to the digital camera system is made at step 395 to determine whether the image capture of actual images is done. If the user turns off the digital camera system or if an internal timer exceeds a time threshold during which no actual images are captured, image capture is assumed to be completed. If image capture is not completed, then the procedure 300 continues at step 335. Compensation may be performed first for defective pixels and then for dark current and hot pixels or vice versa. The order is immaterial. Compensation can also be made at any time that the camera is idle. If image capture is completed, then at step 375 the digital camera system accesses an actual image and uses the white reference images to identify and locate defective pixels. For example, the pixel signal values of an actual image, which are identified as defective in one or more of the defective pixel data structures are replaced with compensated signal values either using a smoothing function based on signal values of available neighboring pixels or scaling the signal values of the defective pixels of the actual image. One example of a scaling factor would be an average white dead pixel signal value divided by the current white dead pixel signal value. The order of compensation for defective pixels is immaterial.

Figure 3B:
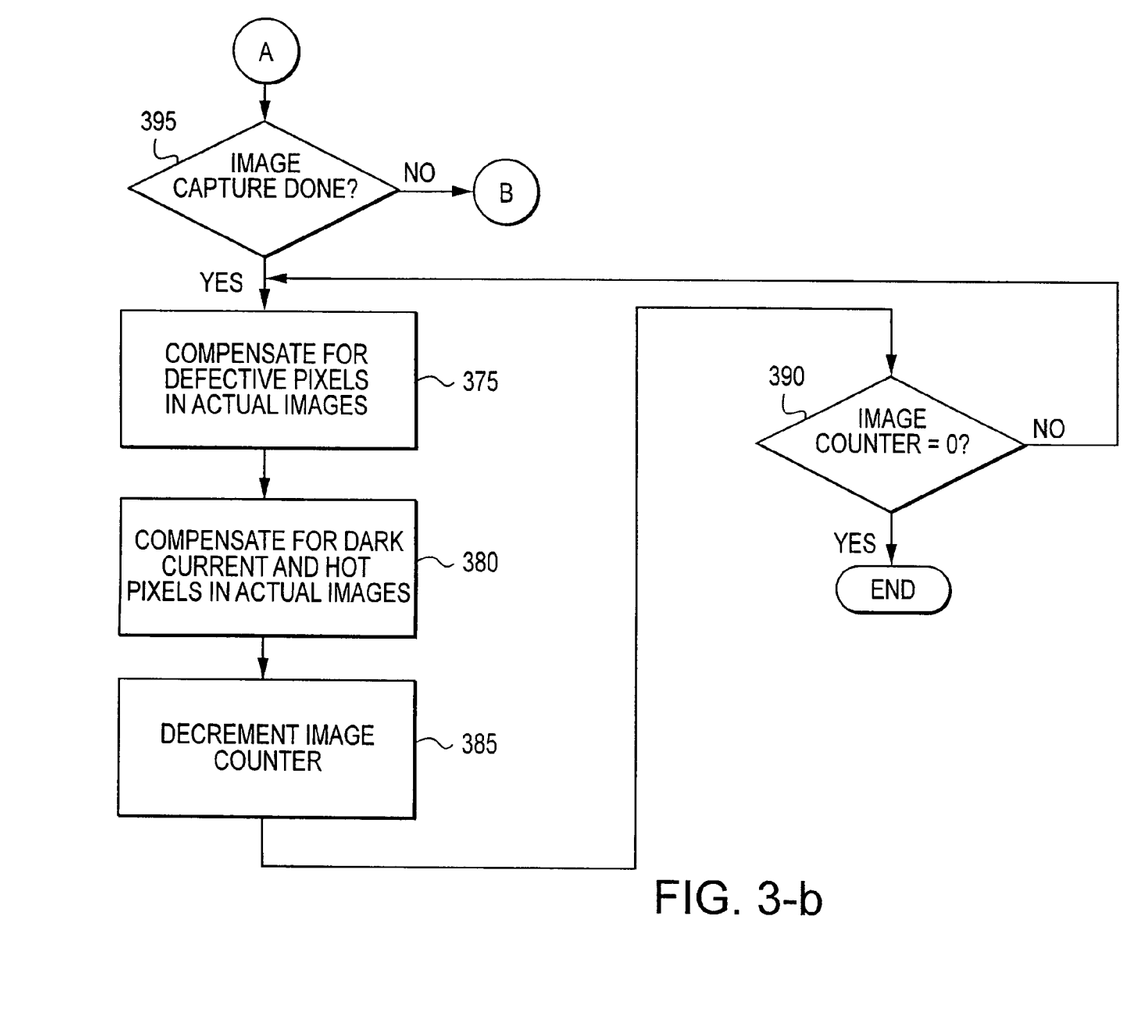

As a specific example, consider dark dead pixels. Using a dark dead pixel location data structure, a dark dead pixel is located. Only pixels identified as dark dead pixels are compensated in this step. The location of the dark dead pixel is used as an index into the actual image and the signal value for this pixel is retrieved. The signal values of neighboring pixels are reviewed. If the neighboring pixel signal values are available then a new (compensated) signal value is calculated for this pixel using neighboring pixel signal values, for example by averaging the pixel signal values of the neighboring pixels. This process is smoothing. Neighboring pixel signal values are not available if the neighboring pixels have also been marked as requiring compensation. If neighboring pixel signal values are not available, then scaling is used. A scaling factor is calculated by dividing an average dark dead pixel signal value for the gain and exposure combination that most closely matches the actual image having pixels to be compensated by the dark dead pixel signal value of the pixel sought to be compensated. The term "most closely matches" means as between two or more gain and exposure combinations, one of the combinations is closer to that of the actual image than the others. That determination may be based upon gain or exposure or both. A new pixel signal value is calculated for the identified dark dead pixel by multiplying the dark dead pixel sought to be compensated by the scaling factor. Compensation for white dead pixels, saturation dead pixels and bad pixels is similarly accomplished.

At step 380, compensation is performed on the pixels identified from the dark current reference images under gain and exposure conditions that most closely match that of the actual image as being affected by dark current and as hot pixels. First, an average dark current signal value is subtracted from the pixel signals affected by pixel dark current as identified in the dark current pixel location data structures and then compensation such as smoothing (using neighboring available pixels) is performed. The average value for leakage level can be calculated for the entire pixel array. This can be subtracted from all images since this is a "baseline signal" that is always present. In the ideal case of perfect pixels, the leakage level would be zero. Next, if the pixel of interest is flagged as a high dark current pixel, the signal value from this pixel is scaled down by a weight factor. For example, the compensated dark current signal value is set equal to the old/original dark current signal value times are average dark current signal value divided by the pixel dark current signal value. If newly defective pixels are identified, their addresses are recorded in a dark current pixel location data structure along with encoded initial conditions for the camera such as exposure, aperture, gain, etc. The compensated pixel signal value is then written back to non-volatile memory replacing the original signal value for that pixel in the actual image. The process is repeated for each pixel in the actual image affected by dark current and each hot pixel.

The image counter for the actual images captured is decremented at step 385 and a test is performed at step 390 to determine if image compensation has been completed for all actual images by testing whether the image counter equals zero. If image compensation has been completed, then the process 300 is completed. If image compensation has not been completed for all actual images, then the process sequence returns to image compensation at step 375 for the next actual image taken by a user.

Dark current and hot pixel compensation is accomplished as shown in FIG. 3-*c*, which is a flowchart of an expanded view of step 380 of FIG. 3-*b* and is performed for each pixel affected by dark current and each hot pixel requiring compensation. Additional information including gain and exposure values is captured and stored for each actual image. The dark current pixel location data structures are searched for the dark current pixel location data structure having a gain and exposure combination that most closely matches that of the actual image at step 380-*a*. Once the most appropriate dark current pixel location data structure is located and retrieved, the selected dark current pixel location data structure is used to determine which pixels must be compensated. Each pixel that must be compensated is located respectively in the actual image. A decision is made by the camera on a per pixel basis if dark current and hot pixel compensation is to be made by smoothing at step 380-*b*. It is assumed that if dark current and hot pixel compensation is not to be performed by smoothing, then dark current and hot pixel compensation will be performed by scaling. The criteria for selection of smoothing versus scaling is performed by the camera as described above with respect to dark dead pixel compensation.

Figure 3C:
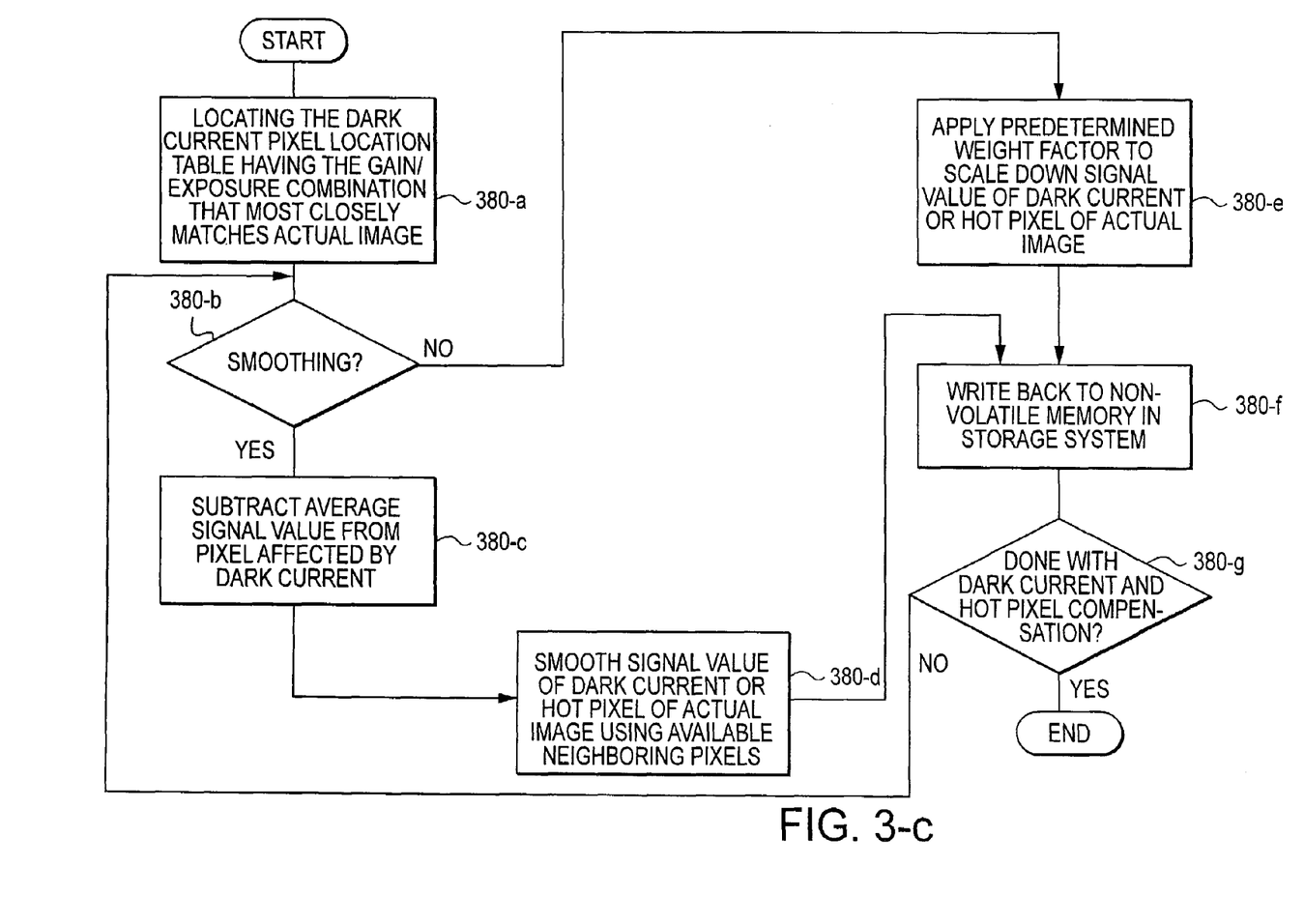
Figure 3D:
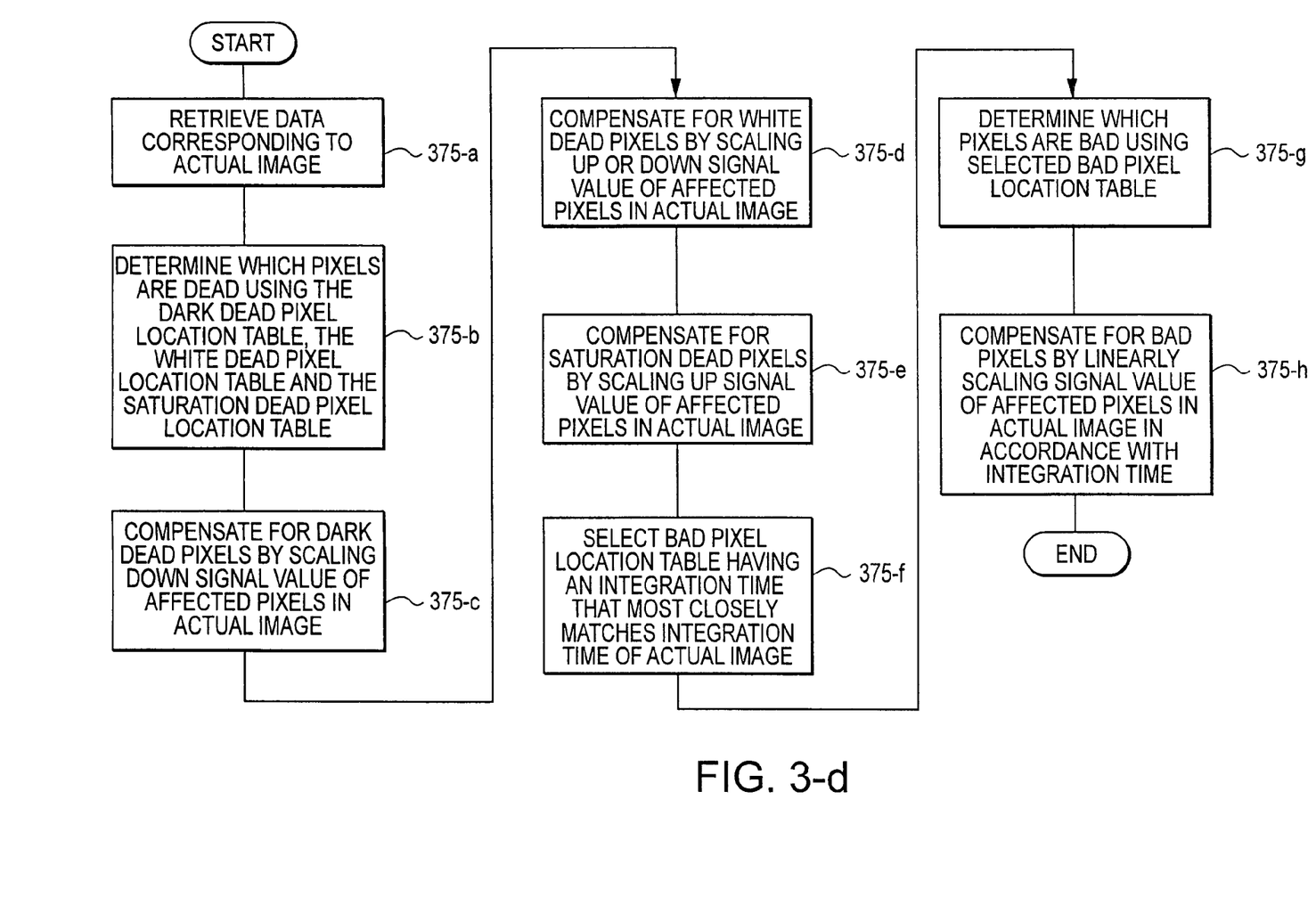
Figure 3E:
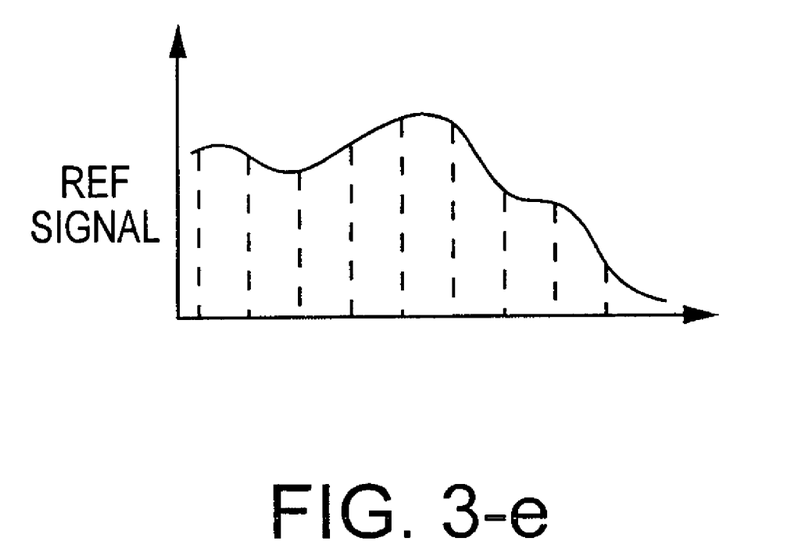
Figure 3F:
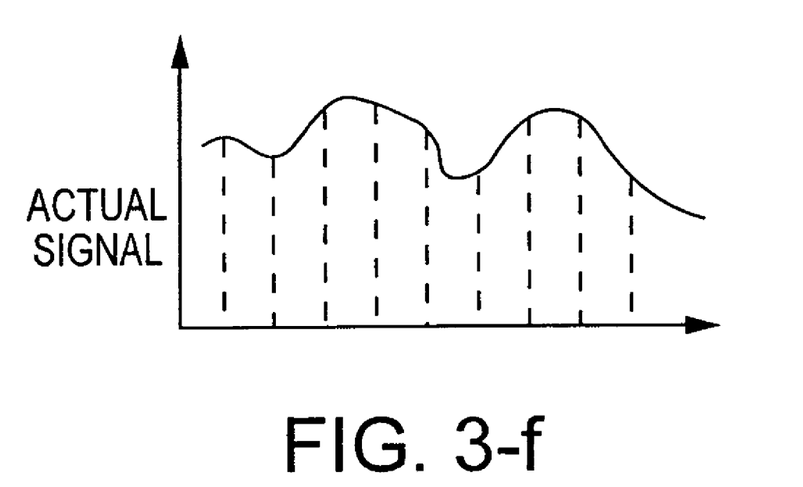

Optionally, prior to dark current and hot pixel compensation by either smoothing or scaling, certain signal offset values may be calculated and subtracted from the actual image. For example, for a given row or column characteristic such as drain-induced barrier lowering (DIBL) and/or gate-induced drain leakage (GIDL), etc. data may be available from the dark current reference images. A signal offset value for the given characteristic is calculated by taking the difference between the value for the given characteristic in the actual image and the data for the given characteristic in the dark current reference images. The signal offset value for the given characteristic is then subtracted from the value for the given characteristic in the actual image. This operation is performed for each row or column of the image and may be performed multiple times depending on the number of characteristics for which there is data in the dark current reference images. For example, a given characteristic may be represented as in FIG. 3-*e* for the reference image. In the actual image, this same characteristic might be represented as in FIG. 3-*f*. The signal offset value for the given characteristic is calculated by subtracting the values in FIG. 3-e from the values in FIG. 3-f. This difference can then be subtracted from the actual image before further processing. The above optional step would occur after step 380-a and before step 380-b.

Dark current and hot pixel compensation is performed by first subtracting an average pixel dark current signal value from the signal value of the pixel affected by dark current at step 380-c and then smoothing using available neighboring pixels to calculate a new signal value for the pixels affected by dark current at step 380-d. Alternatively, at step 380-e dark current and hot pixel compensation may be performed by scaling down the signal value of the pixels affected by dark current by a weight factor such as described above. The compensated dark current signal value is written back at step 380-f to the non-volatile memory of the storage system. Finally, a test is performed at step 380-g to determine if dark current and hot pixel compensation is complete (all dark current and hot pixels have been compensated) for the selected actual image. If dark current and hot pixel compensation is not complete, then processing continues at step 380-b.

Compensation is performed using multiple techniques including a number of mathematical functions such as higher order polynomial functions, gradient operators, Laplacian operators and spline functions. The leakage level and other characteristics will determine which functions and/or operators will be used for the compensation. An example of a higher order polynomical might be $ax^n + bx^{n-1} + cx^{n-2} + \ldots$ where a, b and c are constants and x is the index reference related to a row or column location. A gradient operation might be $$\nabla F = \begin{pmatrix} G_x \\ G_y \end{pmatrix} = \begin{pmatrix} \delta f / \delta x \\ \delta f / \delta y \end{pmatrix} = mag(\nabla f) = [G_x^2 + G_y^2]^{1/2}$$

where the gradient vector points in the direction of maximum rate of change of a function at location (x,y). A Laplacian operator might be $$\nabla^2 F = \frac{\delta^2 f}{\delta x^2} + \frac{\delta^2 f}{\delta y^2}.$$

A spline function may be, for example, cubic or two dimensional polynomials, which are piece-wise polynomials with break points between the pieces.

Defective pixel compensation may be performed in any order. The order described herein and shown in FIG. 3-d, which is a flowchart of an expanded view of step 375 of FIG. 3-b, is arbitrary and should not be construed as limiting. Actual image data is retrieved at step 375-a. A dark dead pixel location data structure having a gain and exposure combination that most closely matches the actual image being compensated is selected and accessed at step 375-b and used to determine which pixels are dark dead pixels that must be compensated. Each dark dead pixel that must be compensated is located respectively in the actual image. Dark dead pixel compensation is performed at step 375-c by scaling down the signal value of each dark dead pixel by a weight factor to an average signal value of normal pixels under the no light condition. The weight factor is calculated by dividing the average signal value of normal pixels under the no light condition by the signal value of the dark dead pixel to be compensated.

The white dead pixel location data structure having a gain and exposure combination that most closely matches the actual image being compensated is selected and accessed at step 375-b and used to determine which pixels are white dead pixels that must be compensated. Each white dead pixel that must be compensated is located respectively in the actual image. White dead pixel compensation is performed at step 375-d by scaling up or down the signal value of each white dead pixel by a weight factor to an average signal value of normal pixels under, for example, the approximately 28 Lux light condition. The weight factor is calculated by dividing the average signal value of normal pixels under, for example, the 28 Lux light condition by the signal value of the white dead pixel to be compensated.

The saturation dead pixel location data structure having a gain and exposure combination that most closely matches the actual image being compensated is selected and accessed at step 375-b and used to determine which pixels are saturation dead pixels that must be compensated. Each saturation dead pixel that must be compensated is located respectively in the actual image. Saturation dead pixel compensation is performed at step 375-e by scaling up the signal value of each saturation dead pixel by a weight factor to an average value of normal pixels under, for example, the approximately 100 Lux light condition. The weight factor is calculated by dividing the average signal value of normal pixels under, for example, the 100 Lux light condition by the signal value of the saturation dead pixel to be compensated.

A bad pixel location data structure is selected at step 375-f from among the plurality of bad pixel location data structures based on a closest match to the exposure and gain of the actual image. A determination is made at step 375-g as to which pixels are bad based on the selected bad pixel location data structure. Bad pixel compensation is accomplished at step 375-h by adjusting the signal value of each pixel respectively in the actual image that is bad by scaling the signal value to correspond linearly with the integration time. Finally, one or more colors of a bad pixel may be defective. For example, if the pixel of interest is a 'red' pixel, a formula is used that weighs more on red from the neighboring pixels, e.g., 50% from neighboring red pixels and 25% each from neighboring blue or green pixels. If two colors are bad, then a formula that weighs the two defective colors may be used. For example, if the pixel of interest is defective in both "blue" and "green," then a formula is used that weighs 40% on blue, 40% on green and 20% on red.

The exemplary image signal processing methods described above may be implemented in software, hardware, firmware, application specific integrated circuits (ASICs), field programmable gate arrays (FPGAs) or any combinations of the above or their equivalent.

A typical processor based system 900 that includes a CMOS imager device according to the present invention as described above is illustrated generally in FIG. 4. A processor based system is exemplary of a system having digital circuits that could include CMOS imager device 910 the details of which are described with reference to FIGS. 1 through 3d.

Figure 4:
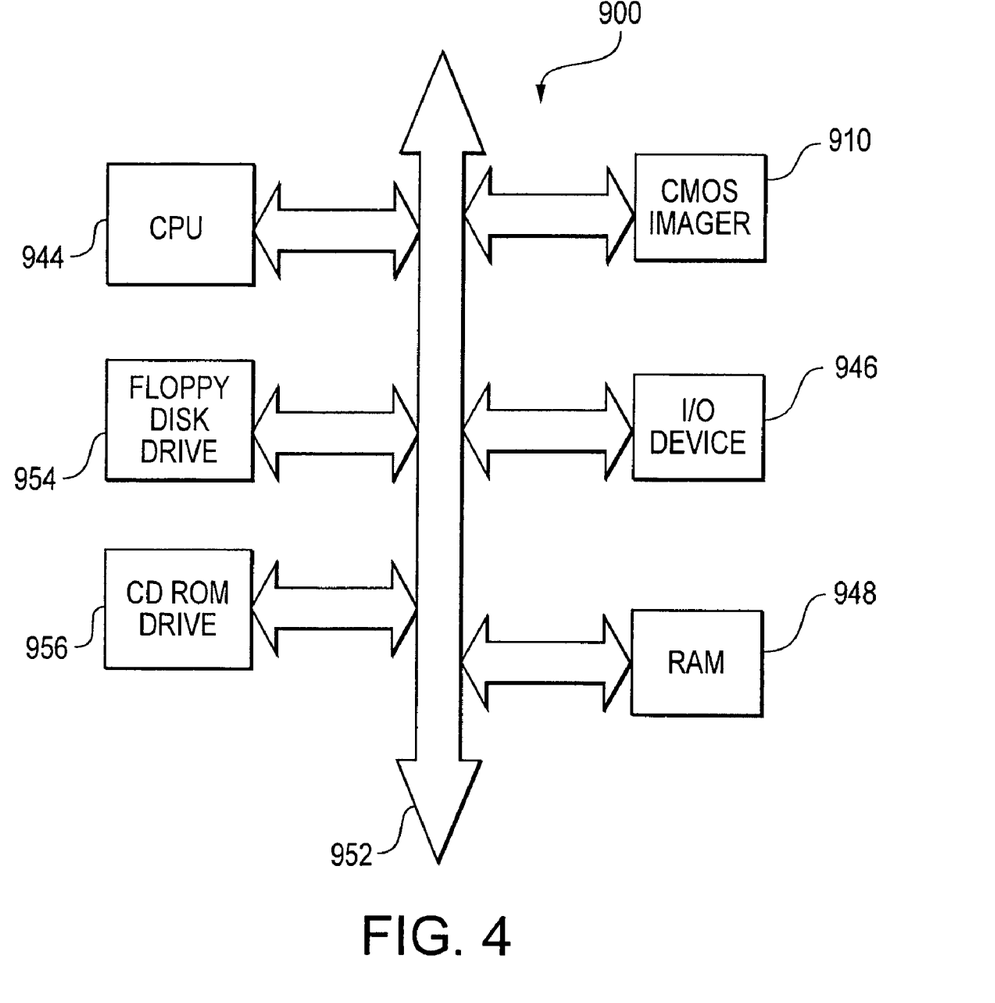
FIG. 4 is a block diagram of a computer system having a dark current and defective pixel compensation circuit of the present invention.

A processor system, such as a computer system, for example generally comprises a central processing unit (CPU) 944 that communicates with an input/output (I/O) device 946 over a bus 952. The CMOS imager 910 also communicates with the system over bus 952. The computer system 900 also includes random access memory (RAM) 948, and, in the case of a computer system may include peripheral devices such as a floppy disk drive 954 and a compact disk (CD) ROM drive 956 which also communicate with CPU 944 over the bus 952.

Software could be stored on a floppy disk drive 954 or an a CD-ROM drive 956 for execution on image processor 140 or CPU/processor 147.

It should again be noted that although the invention has been described with specific reference to CMOS imaging devices, the invention has broader applicability and may be used in any imaging apparatus. The above description and drawings illustrate preferred embodiments of the present invention. It is not intended that the present invention be limited to the illustrated embodiments. Any modification of the present invention that comes within the spirit and scope of the following claims should be considered part of the present invention.

What is claimed as new and desired to be protected by Letters Patent of the United States is:

1. An image processing apparatus comprising:
    a memory apparatus for storing at least one actual image, at least one dark current reference image, and at least one white reference image captured by a pixel array, the storage system further storing a plurality of gain conditions and a plurality of exposure times associated with the at least one actual image and a plurality of gain conditions and a plurality of exposure times associated with the at least one dark current reference image and the at least one white reference image; and
    a processor coupled to the storage system for compensating the at least one actual image by identifying defective pixels of the at least one actual image based on at least one gain condition of the stored plurality of gain conditions associated with the at least one dark current reference image and the at least one white reference image, and at least one exposure time of the stored plurality of exposure times associated with the at least one dark current reference image and the at least one white reference image, and applying at least one defective pixel compensation process to the identified defective pixels.

2. The image processing apparatus of claim 1, wherein the processor performs the compensation using an associated gain and exposure time associated with the at least one dark current reference image and the at least one white reference image that substantially match the gain and exposure time associated with the at least one actual image.

3. The image processing apparatus of claim 2, wherein the processor further performs dark current compensation to the at least one actual image.

4. The image processing apparatus of claim 1, wherein the processor identifies defective pixels affected by dark current using the at least one dark current reference image.

5. The image processing apparatus of claim 1, wherein the processor identifies defective pixels affected by white current using the at least one white reference image.

6. The image processing apparatus of claim 1, wherein the processor captures a plurality of dark current reference images under a plurality of gain conditions and exposure times for creating a respective dark current reference image and for each combination of the plurality of gain and exposure conditions, identifies locations of dark current pixels which require compensation; and creates from the captured plurality of dark current reference images the respective dark current reference image and for each gain combination of gain conditions and exposure times, identifies locations of hot pixels that require compensation.

7. The image processing apparatus of claim 6, wherein the processor further selects one of the dark current and hot pixel reference images by selecting one of the plurality of gain condition and exposure time combinations based on the gain condition and exposure time combination that substantially matches the gain condition and exposure time combination of the at least one dark current reference image and the at least one white reference image.

8. The image processing apparatus of claim 7, wherein the processor further smoothes the pixels affected by dark current using signal values from available neighboring pixels, the pixels affected by dark current being identified using the selected dark current and hot pixel reference images, the signal value of each pixel identified as affected by dark current being retrieved from the at least one dark current reference image and the at least one white reference image.

9. The image processing apparatus of claim 7, wherein the processor scales down the signal value of a pixel affected by dark current, the pixels affected by dark current being identified using the selected dark current and hot pixel reference images, the signal value of each pixel identified as affected by dark current being retrieved from the at least one dark current reference image and the at least one white reference image.

10. An image processing apparatus comprising:
    a memory device for storing at least one actual image, at least one dark current reference image, and at least one white reference image captured by a pixel array, the storage system further storing a plurality of gain conditions and a plurality of exposure times associated with the at least one actual image and a plurality of gain conditions and a plurality of exposure times associated with the at least one dark current reference image and the at least one white reference image; and
    a processor coupled to the storage system for compensating the at least one actual image by identifying defective pixels of the at least one actual image based on at least one gain condition of the stored plurality of gain conditions associated with the at least one dark current reference image and the at least one white reference image, and at least one exposure time of the stored plurality of exposure times associated with the at least one dark current reference image and the at least one white reference image, applying at least one defective pixel compensation process to the identified defective pixels, capturing a plurality of white reference images under a plurality of gain conditions and exposure times for creating a respective defective pixel reference image, and for each combination of gain conditions and exposure times, identifying locations of defective pixels that need compensation.

11. The image processing apparatus of claim 10, wherein the processor captures the plurality of white reference images under a plurality of light conditions for creating a respective defective pixel reference image.

12. The image processing apparatus of claim 11, wherein the plurality of light conditions comprise a no light condition, a first light condition and a second light condition having a higher Lux value than the first light condition.

13. The image processing apparatus of claim 12, wherein the processor further creates a dark dead pixel reference image, and for each gain condition and exposure time combination, identifies locations of dark dead pixels that require compensation.

14. The image processing apparatus of claim 13, wherein the processor further creates a white dead pixel reference image, and for each gain condition and exposure time combination, identifies locations of white dead pixels that require compensation.

15. The image processing apparatus of claim 11, wherein the processor further creates a saturation dead pixel reference image, and for each gain condition and exposure time combination, identifies locations of saturation dead pixels that require compensation.

16. The image processing apparatus of claim 11, wherein the processor further creates a bad pixel reference image for each gain condition and exposure time combination, and identifies locations of bad pixels that require compensation.

17. The image processing apparatus of claim 13, wherein the processor compensates for dark dead pixels by scaling down the signal level of pixels identified as dark dead pixels to an average signal level for normal pixels under the no light condition using the dark dead pixel reference image to locate the dark dead pixels.

18. The image processing apparatus of claim 14, wherein the processor compensates for white dead pixels by one of scaling up and scaling down the signal level of pixels identified as white dead pixels to an average value for normal pixels under the first light condition using the white dead pixel reference image to locate the white dead pixels.

19. The image processing apparatus of claim 15, wherein the processor compensates for saturation dead pixels by scaling up the signal level of pixels identified as saturation dead pixels to an average value for normal pixels under the second light condition using the saturation dead pixel reference images to locate the saturation dead pixels.

20. A digital camera comprising:
an image compensation apparatus having:
  a memory device for storing at least one actual image, at least one dark current reference image, and at least one white reference image captured by a pixel array, the storage system further storing a plurality of gain conditions and a plurality of exposure times associated with the at least one actual image and a plurality of gain conditions and a plurality of exposure times associated with the at least one dark current reference image and the at least one white reference image; and
  a processor coupled to the storage system for compensating the at least one actual image by identifying defective pixels of the at least one actual image based on at least one gain condition of the stored plurality of gain conditions associated with the at least one dark current reference image and the at least one white reference image, and at least one exposure time of the stored plurality of exposure times associated with the at least one dark current reference image and the at least one white reference image, and applying at least one defective pixel compensation process to the identified defective pixels.

* * * * *